UNITED STATES PATENT OFFICE 2,038,942

METALLIZABLE AZODYESTUFFS AND THEIR PRODUCTION

Georges Kopp, Rouen, France, assignor to Compagnie Nationale de Matieres Colorantes et Manufactures de Produits Chimiques du Nord Reunies, Etablissements Kuhlmann, Paris, France, a corporation of France No Drawing. Application January 25, 1935, Serial No. 3,533. In France February 2, 1934

8 Claims. (Cl. 260—89)

My invention relates to the manufacture of azodyestuffs, and in particular to such as contain metals.

In accordance with the present invention the mordant dyestuffs obtained by starting on the one hand from the condensation products of 1,8-naphthosultone-4-sulphochloride with ammonia or aliphatic or aromatic amines which can be substituted by sulpho, halogen and other groups, of the type:—

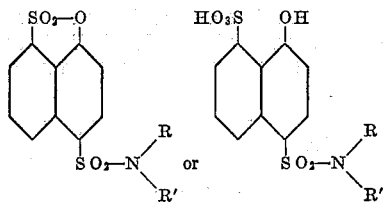

(R, R'=H, alkyl, aryl, aralkyl and the like) and on the other hand from diazo compounds of o-aminophenols, o-aminonaphthols, o-aminocarboxylic acids and their substitution products or derivatives, are capable of being converted into valuable dyestuffs containing metals when they are treated with the appropriate metal salts.

This transformation may be realized as well on the dyed fibre as on the dyestuffs themselves.

The presence of the sulphamide radicle in the 4-position permits control of the coupling in the 2-position with all the diazo orthohydroxyl or orthocarboxyl compounds, without the activity of the naphtholic function being diminished. Thus the diazo derivatives of the orthoaminophenol and its substitution products couple easily with the naphthols described in the present specification, for instance in a sodium carbonate medium whereas the derivatives of the alpha naphthol substituted in the 4-position by a sulpho group couple with the same diazo compounds only in presence of lime, magnesia or baryta, so that there is necessary in said case a subsequent transformation into sodium or potassium salt in order to permit industrial working with said dyestuffs. These transformations are onerous and are sometimes accompanied by the partial decomposition of the orthohydroxyazo dyestuffs reputed to be unstable in alkaline medium.

Notably the chromed and coppered compounds obtained in this manner dye vegetable or animal fibres in very even and very fast shades passing from Bordeaux to violet and blue. In addition the brightness of the shades obtained is superior to that of similar products at present known.

The blue shades obtained by means of the ortho-diazo naphthols have the notable advantage of not turning red under the influence of artificial light. This advantage appears clearly when comparative dyeings on wool of a commercial product of analogous shade, for example, the dyestuff prepared following Example 6 of the French Patent No. 612,816 by starting from β naphthol, and for instance of the chromed dyestuff made according to Example 10 described hereafter, are observed under artificial light. Indeed, such a commercial product of shade analogous when it is compared in daylight for instance with the dyestuff made according to Example 10 appears to be a deeper red than the latter under artificial light.

The following examples illustrate the invention:—

Example 1

50 parts of the diazo compound of 1-amino-2-hydroxy-4-naphthalene-sulphonic acid in the form of a paste are introduced into a mixture of 92 parts of 1-hydroxy-4-sulphonyl-α-naphthylamide-8-naphthalene-sulphonic acid, 750 parts of water and 100 parts of caustic soda of 35° Bé.; the whole is agitated for some time until the diazo compound disappears then neutralization is effected with dilute hydrochloric acid and the dyestuff is precipitated by means of common salt.

This dyestuff dyes wool from an acid bath in Bordeaux shades which change to blue on subsequent chroming.

Example 2

46 parts of the diazo compound of 2-amino-1-phenol-4-sulphonic acid are introduced into a mixture of 92 parts of 1-hydroxy-4-sulphonyl-α-naphthylamide-8-naphthalene-sulphonic acid, 400 parts of water, 80 parts of caustic soda of 35° Bé. and 40 parts of sodium carbonate. The whole is agitated for some time until the complete disappearance of the diazo compound, neutralization is effected with dilute hydrochloric acid and the dyestuff is precipitated by means of common salt.

The dyestuff dyes wool from an acid bath in a red Bordeaux shade changing to violet on subsequent chroming.

Example 3

25 parts of 1-diazo-2-naphthol-4-sulphonic acid are introduced into a mixture of 38 parts of 1-hydroxy-4-sulphonyl-anilide-8 naphthalene-sulphonic acid, 50 parts of caustic soda of 35° Bé. and 400 parts of water. The whole is agitated at ordinary temperature for some time until the diazo compound disappears, then is acidified, and the dyestuff is separated by the addition of salt and filtration.

The new dyestuff dyes wool from an acid bath in Bordeaux shade which changes to violet on subsequent treatment with copper sulphate.

Example 4

A solution containing 20 parts of 5-sulpho-benzene-1-2-diazo-oxide is poured into a solution of 43 parts of 1-hydroxy-4-sulphonyl-alpha-naphthyl-amide-8-naphthalene sulphonic acid, 30 parts of caustic soda of 35° Bé. and 20 parts of anhydrous sodium carbonate in 500 parts of water to 10° C. The whole is agitated for some time until the complete disappearance of the diazo compound, and the dyestuff is separated by acidification, addition of salt and filtration.

This dyestuff dyes wool in red changing to very fast blue Bordeaux on subsequent treatment with the chrome mordants.

Example 5

The dyestuff derived from 1-hydroxy-2-amino-4-chloro-benzene-6-sulphonic acid and from 1-hydroxy-4-sulphonyl-anilide-8-naphthalene sulphonic acid is prepared according to Example 4.

This dyestuff dyes the animal fibres in red changing to very fast violet on subsequent treatment with bichromate.

Example 6

In Example 5, the 1-hydroxy-2-amino-4-chloro-benzene-6-sulphonic acid is replaced by the 1-hydroxy-2-amino-6-nitro-benzene-4 sulphonic acid. A dyestuff is obtained which dyes in violet brown the animal fibres treated with chrome mordants.

Example 7

A solution containing 15 parts of 4-chloro-benzene 2-1 diazo-oxide is added to aqueous solution of 30 parts of 1-hydroxy-4 sulphonyl-amide-8 naphthalene sulphonic acid, 30 parts of caustic soda and 10 parts of anhydrous sodium carbonate. The dyestuff is separated by acidification and filtration.

This dyestuff dyes the animal fibres in red changing to violet red on subsequent chroming.

Example 8

22 parts of 1-amino-2-carboxy-benzene 5-sulphonic acid are diazotized in the usual manner and the diazo compound is poured into a mixture of 38 parts of 1-hydroxy-4-sulphonyl-anilide-8-naphthalene-sulphonic acid, 25 parts of caustic soda of 35° Bé. and 25 parts of anhydrous sodium carbonate.

The dyestuff, separated at the end of some hours of agitation, dyes animal fibres treated with chrome mordants in a bright and very fast to light Bordeaux shade.

Example 9

180 parts of the dyestuff prepared according to Example 2 starting from the 1-hydroxy-4-sulphonyl-anilide-8-naphthalene-sulphonic acid and from the diazo compound of 4-chloro-2-amino-phenol are heated in an autoclave to 135° C. for 3 hours with 800 parts of water and 100 parts of chrome alum. On cooling the chromed dyestuff precipitates and it is separated by filtration.

The dyestuff dyes wool from an acid bath in very bright even and fast violet shades.

Example 10

60 parts of the dyestuff prepared according to Example 3 are heated under pressure at 110° C. with 400 parts of water and 50 parts of chromed alum. After two hours' heating, no more chrome dyestuff is changed. The chromed dyestuff crystallizes on cooling.

This dyestuff dyes the animal fibres in very fast blue which turns not towards the red under artificial light.

Example 11

50 parts of the dyestuff prepared according to Example 4 are refluxed during some hours with a solution of chrome sulphate containing 15 parts of chromium oxide. The swift transformation into a chromed compound of Bordeaux shade is provided. The new dyestuff is separated by evaporation or in vacuum, or by addition of salt and filtration. It dyes the animal fibres in blue Bordeaux shade which is very fast and very even.

These dyestuffs may also be treated with metal according to other methods. The qualities of the products obtained vary pursuant to the agent providing metal employed and they depend upon the physical and chemical conditions of the reactions. It is indicated below, for instance, the shades of the dyeing on wool from an acid bath obtained by means of the dyestuff chromed according to the processes of the French Patent No. 664,997:

| Dyestuff of the example No.: | Shade after chroming according to the French Patent No. 664,997. Dyeing on wool from an acid bath. |
| --- | --- |
| 3 | Blue |
| 4 | Violet Bordeaux |
| 5 | Red violet |
| 6 | Violet brown |
| 7 | Red violet |
| 8 | Bordeaux |

What I claim is:

1. Process for the manufacture of azodyestuffs capable of treatment with metals consisting in coupling a diazo component derived from one of the compounds of the group consisting of the o-aminophenols, the o-aminonaphthols, and the o-amino-carboxylic acids with a product of the condensation of 1,8-naphthosultone-4-sulpho-chloride with a compound of the group consisting of ammonia, the aliphatic amines and the aromatic amines.

2. Process for the manufacture of azodyestuffs capable of treatment with metals consisting in coupling a diazo component derived from one of the compounds of the group consisting of the o-aminophenols, the o-aminonaphthols, and the o-amino-carboxylic acids with a product of the condensation of 1,8-naphthosultone-4-sulpho-chloride with α-naphthylamine.

3. Process for manufacture of azodyestuffs capable of treatment with metals consisting in coupling a diazo component derived from one of the compounds of the group consisting of the o-aminophenols, the o-aminonaphthols, and the o-amino-carboxylic acids with a product of the condensation of 1,8-naphthosultone-4-sulpho-chloride with aniline.

4. Process for the manufacture of azodyestuffs capable of treatment with metals as claimed in claim 1 in which the compound of the group consisting of the o-aminophenols, the o-aminonaphthols, and the o-amino carboxylic acids is substituted by a member of the group consisting of halogen, alkyl and sulphonic acid radicles.

5. Azodyestuff capable of being treated with metals comprising the product obtained by the coupling of a diazo compound derived from one of the compounds of the group consisting of the o-aminophenols, the o-aminonaphthols, and the o-aminocarboxylic acids with a product of condensation of 1,8-naphthosultone-4-sulphochloride with a compound of the group consisting of ammonia, the aliphatic amines and the aromatic amines.

6. Azodyestuffs capable of being treated with metals comprising the product obtained by the coupling of a diazo compound derived from one of the compounds of the group consisting of the o-aminophenols, the o-aminonaphthols, and the o-aminocarboxylic acids with a product of condensation of 1,8-naphthosultone-4-sulphochloride with α-naphthylamine.

7. Azodyestuff capable of being treated with metals comprising the product obtained by the coupling of a diazo compound derived from one of the compounds of the group consisting of the o-aminophenols, the o-aminonaphthols, and the o-aminocarboxylic acids with a product of condensation of 1,8-naphthosultone-4-sulphochloride with aniline.

8. Azodyestuff capable of being treated with metals according to claim 5 in which the compound of the group consisting of the o-aminophenols, the o-aminonaphthols, and the o-aminocarboxylic acids is substituted by a member of the group consisting of the halogen, alkyl and sulphonic acid radicles.

GEORGES KOPP.